(12) United States Patent
Moul et al.

(10) Patent No.: US 12,311,733 B1
(45) Date of Patent: May 27, 2025

(54) SOLAR AGGRESSIVENESS FACTOR FOR DETERMINING AIRFLOW AND DISCHARGE TEMPERATURE OF A VEHICLE HVAC SYSTEM

(71) Applicant: Rivian IP Holdings, LLC, Irvine, CA (US)

(72) Inventors: Zachary Kyle Moul, Hermosa Beach, CA (US); Ean Joshua Hall, Long Beach, CA (US); Paulo Lucena Kreppel Paes, Irvine, CA (US); Dewashish Prashad, Irvine, CA (US); Ajay Panekkad, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/799,834

(22) Filed: Aug. 9, 2024

Related U.S. Application Data

(60) Provisional application No. 63/641,862, filed on May 2, 2024.

(51) Int. Cl.
*B60H 1/00* (2006.01)
*B60H 1/32* (2006.01)
(Continued)

(52) U.S. Cl.
CPC ....... *B60H 1/0075* (2013.01); *B60H 1/00742* (2013.01); *B60H 1/00828* (2013.01); *B60H 1/00878* (2013.01); *B60H 1/3205* (2013.01);
*G01J 1/42* (2013.01); *G01K 13/00* (2013.01); *B60H 2001/3272* (2013.01); *G01J 2001/4266* (2013.01)

(58) Field of Classification Search
CPC .............. B60H 1/0075; B60H 1/00742; B60H 1/00828; B60H 1/00878; B60H 1/3205; B60H 2001/3272; G01J 1/42; G01J 2001/4266; G01K 13/00
See application file for complete search history.

(56) References Cited

U.S. PATENT DOCUMENTS

| | | | | |
|---|---|---|---|---|
| 2002/0053601 | A1* | 5/2002 | Kamiya | B60H 1/00742 236/91 C |
| 2002/0139862 | A1* | 10/2002 | Tsunoda | B60H 1/0075 236/91 C |

(Continued)

*Primary Examiner* — Marc E Norman
(74) *Attorney, Agent, or Firm* — Patterson + Sheridan, LLP

(57) ABSTRACT

A vehicle includes a system configured to supply air to a cabin of a vehicle at a target discharge temperature. One or more solar sensors configured to sense a solar radiation on the cabin and one or more temperature sensors configured to sense air within the cabin. A controller is configured to receive a user set temperature, obtain a solar heat load from one or more outputs of the one or more solar sensors, and obtain a feedback temperature from one or more outputs of the one or more temperature sensors. The controller is further configured to determine a radiation temperature corresponding to radiative heat transfer into the cabin, the radiation temperature being a function of the feedback temperature and the solar heat load. The controller may then set the target discharge temperature according to the user set temperature, the feedback temperature, and the radiation temperature.

18 Claims, 7 Drawing Sheets

(51) Int. Cl.
*G01J 1/42* (2006.01)
*G01K 13/00* (2021.01)

(56) References Cited

U.S. PATENT DOCUMENTS

| | | | |
|---|---|---|---|
| 2019/0248208 A1* | 8/2019 | Higashitani | B60H 1/0075 |
| 2021/0094388 A1* | 4/2021 | Kakade | B60H 1/0073 |
| 2021/0291615 A1* | 9/2021 | Kodama | G01J 5/0859 |
| 2021/0291619 A1* | 9/2021 | Aghniaey | B60W 50/10 |
| 2023/0063435 A1* | 3/2023 | Chewter | B60H 1/00878 |

* cited by examiner

SOLAR AGGRESSIVENESS FACTOR FOR DETERMINING AIRFLOW AND DISCHARGE TEMPERATURE OF A VEHICLE HVAC SYSTEM

CROSS-REFERENCE TO RELATED APPLICATIONS

This application claims priority to and benefit of U.S. Provisional Patent Application No. 63/641,862, filed May 2, 2024, which is assigned to the assignee hereof and hereby expressly incorporated herein in its entirety as if fully set forth below and for all applicable purposes.

INTRODUCTION

The present disclosure relates to controlling a heating, ventilation, and air conditioning (HVAC) system of a vehicle.

SUMMARY

The present disclosure describes an approach for controlling a heating, ventilation, and air conditioning (HVAC) system of a vehicle to account for solar load. In one aspect, a vehicle includes a system configured to supply air to a cabin of a vehicle at a target discharge temperature. The vehicle further includes one or more solar sensors configured to sense solar radiation on the cabin and one or more temperature sensors configured to sense air within the cabin. A controller is coupled to the system, the one or more solar sensors, and the one or more temperature sensors. The controller is configured to receive a user set temperature, obtain a solar heat load from one or more outputs of the one or more solar sensors, and obtain a feedback temperature from one or more outputs of the one or more temperature sensors. The controller is further configured to determine a radiation temperature corresponding to radiative heat transfer into the cabin, the radiation temperature being a function of the feedback temperature and the solar heat load. The controller may then set the target discharge temperature according to the user set temperature, the feedback temperature, and the radiation temperature.

DETAILED DESCRIPTION

Sunlight incident on a vehicle cabin directly affects the temperature within the cabin. The amount of solar radiation may be sensed using a sun-light-rain (SLR) sensor of the vehicle. The discharge temperature of an HVAC system of the vehicle may be adjusted by a solar offset corresponding to the amount of solar radiation. However, in some scenarios such adjustments may be unpleasant or unexpected, such as when the cabin temperature is close to a user set temperature. A solar aggressiveness factor is described herein and is used to scale down the solar offset. In general, the solar aggressiveness factor will be smaller as the temperature in the cabin falls toward a user set temperature. The solar aggressiveness factor may be a function of a mean radiation temperature that accounts for the amount of solar radiation as well as the ambient temperature and discharge temperature of the HVAC system.

Figure 1A:
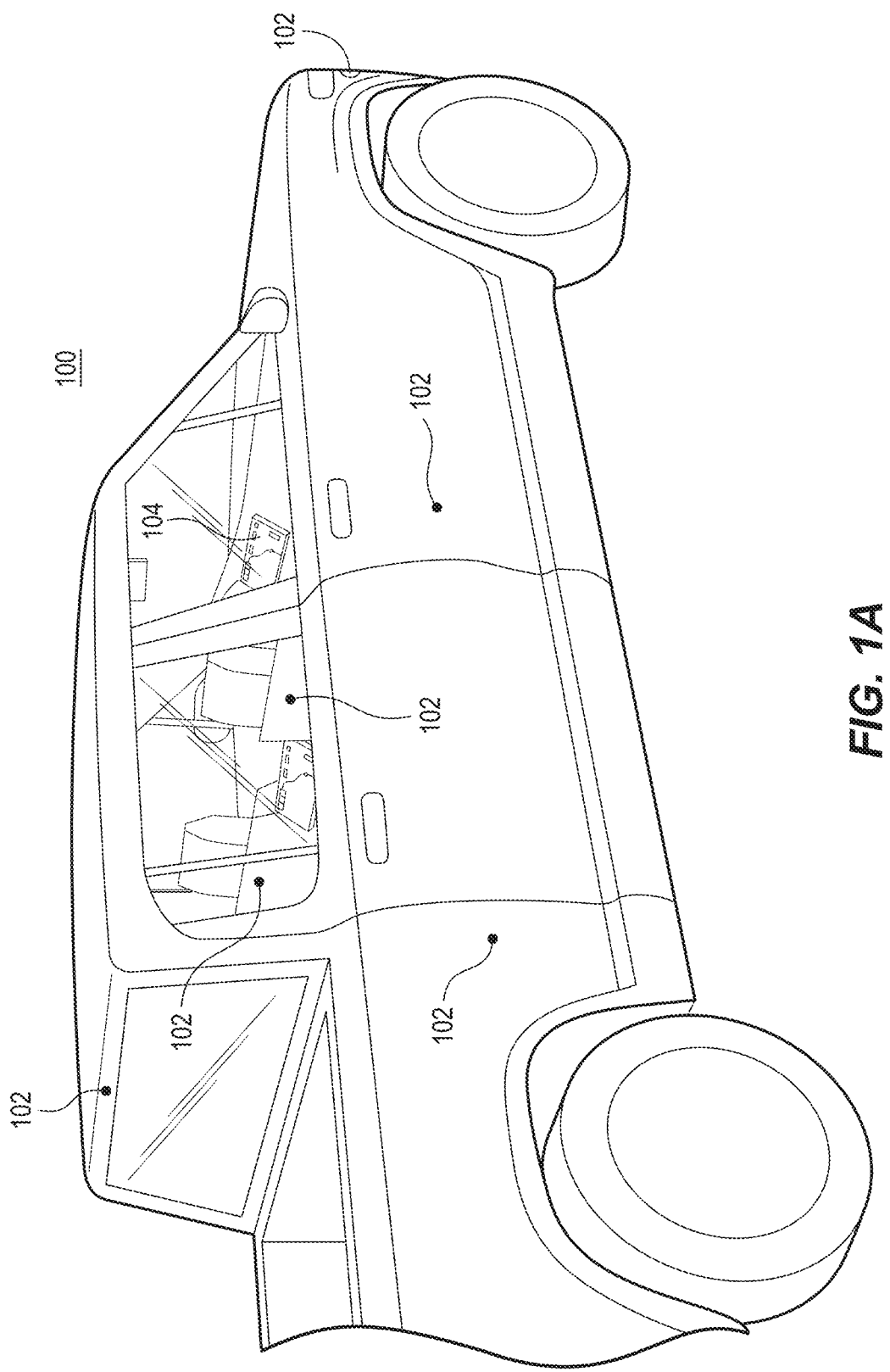
FIG. 1A illustrates an example vehicle that may be operated in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
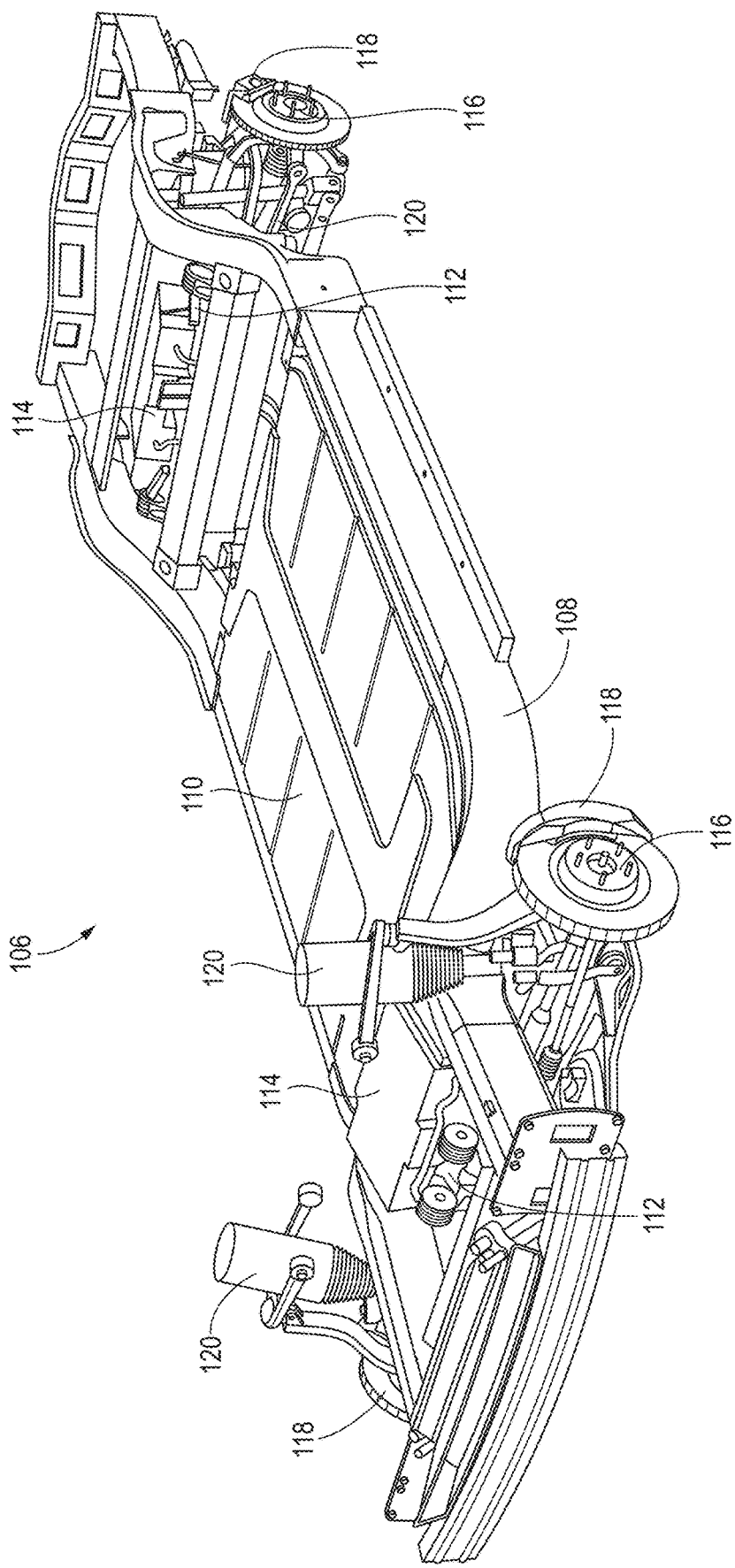
FIG. 1B illustrates a chassis of a vehicle having multiple drive units that may be operated in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear train providing a gear reduction. In some embodiments, there is a single drive unit 112 driving either the front wheels or the rear wheels of the vehicle 100. In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the drive units 112 by power electronics 114 of each drive unit 112. The power electronics 114 may include inverters configured to convert direct current (DC) from the battery 110 into alternating current (AC) supplied to the motors of the drive units 112. The power electronics 114 further facilitate operation of the motors of the drive units as generators to provide regenerative braking. The power electronics 114 further facilitate the transfer of regenerative current to the battery 110.

The drive units 112 are coupled to two or more hubs 116 to which wheels may mount. Each hub 116 includes a corresponding brake 118, such as the illustrated disc brakes.

Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIG. 1B and in the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain that may have a portion that is idled during some modes of operation. For example, a front or rear differential of an all-wheel drive vehicle. In another example, in a hybrid drive train, an idled drive unit including an electric motor may be heated with waste heat from an ICE according to the approaches described herein.

Figure 2:
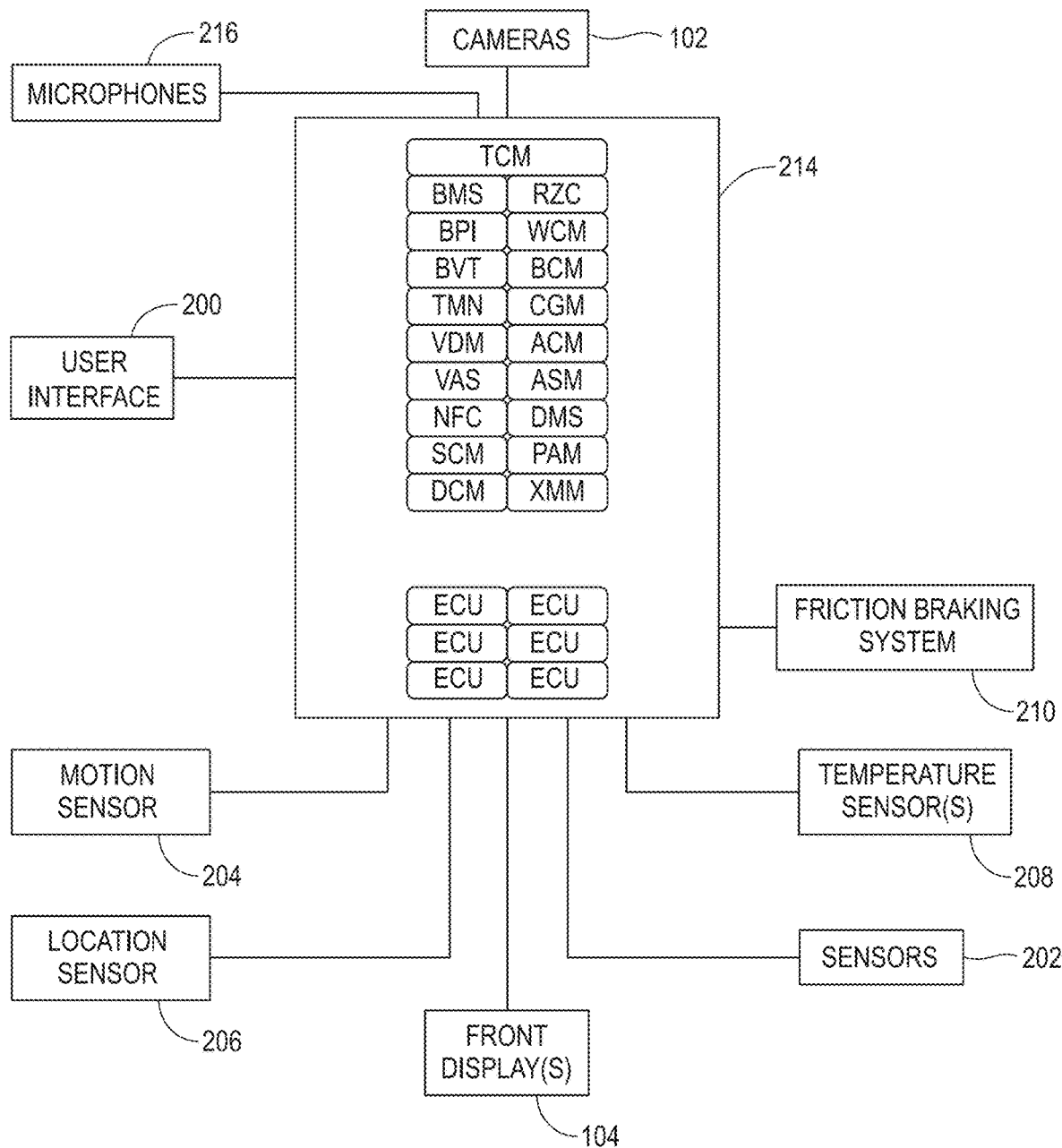
FIG. 2 is a schematic block diagram of components for operating the vehicle in accordance with certain embodiments.

FIG. 2 illustrates example components of the vehicle 100 of FIG. 1A. As seen in FIG. 2, the vehicle 100 includes the cameras 102, the one or more front displays 104, a user interface 200, one or more sensors 202, a motion sensor 204, and a location system 206. The one or more sensors 202 may include ultrasonic sensors, radio detection and ranging (RADAR) sensors, light detection and ranging (LIDAR) sensors, or other types of sensors. The location system 206 may be implemented as a global positioning system (GPS) receiver. The user interface 200 allows a user, such as a driver or passenger in the vehicle 100, to provide input.

The components of the vehicle 100 may include one or more temperature sensors 208. The temperature sensors 208 may include sensors configured to sense an ambient air temperature, temperature of the battery 110, temperature of power electronics 114, temperature of each drive unit 112 and/or each motor of each drive unit 112, temperature of coolant fluid entering or leaving a coolant system, temperature of oil within a drive unit 112, or the temperature of any other component of the vehicle 100.

The components of the vehicle 100 may include a friction braking system 210. The friction braking system 210 may include any components of a hydraulic braking system, such as a rotor, brake pads, calipers, caliper pistons, a master cylinder coupled to the brake pedal and coupled to the caliper pistons by brake lines. The friction braking system 210 may further include a pump and/or valves for automatically applying hydraulic pressure to the caliper pistons. The friction braking system 210 may be implemented as a drum braking system or any friction braking system known in the art.

A control system 214 executes instructions to perform at least some of the actions or functions of the vehicle 100, including the functions described in relation to FIGS. 3 to 6. For example, as shown in FIG. 2, the control system 214 may include one or more electronic control units (ECUs) configured to perform at least some of the actions or functions of the vehicle 100, including the functions described in relation to FIGS. 3 to 6. In certain embodiments, each of the ECUs is dedicated to a specific set of functions. Each ECU may be a computer system, and each ECU may include functionality described below in relation to FIGS. 3 to 7B.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfers data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102, sensors 202, motion sensor 204, location system 206, and temperature sensors 208. The sensor signals collected by the CGM ECU are then communicated to the appropriate ECUs for performing, for example, the operations and functions described in relation to FIGS. 3 to 7B.

The control system 214 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU.

If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 216, etc.) to the TCM ECU.

The ECUs may include one or more ECUs that are configured to control the friction braking system 210. For example, the ECUs may include a traction control module, a stability control system, automated emergency braking (AEB) module, anti-lock braking system (ABS), adaptive cruise control module (ACC), and/or an automated driving assistance system (ADAS). The traction control module controls braking and acceleration to control wheel slip according to any approach known in the art. The traction control module may also control the torque applied at each wheel, i.e., torque vectoring. The stability control system controls braking and acceleration in order to avoid rollovers of the vehicle 100 according to any approach known in the art. The AEB module stops the vehicle 100 in a controlled manner response to predicted collisions according to any approach known in the art. The ABS modulates braking to maintain traction. The ACC maintains a speed of the vehicle while also maintaining a prescribed following distance with respect to other vehicles. The ADAS controls steering, acceleration, and braking of the vehicle 100 to arrive at a destination according to any self-driving approach known in the art.

Figure 3:
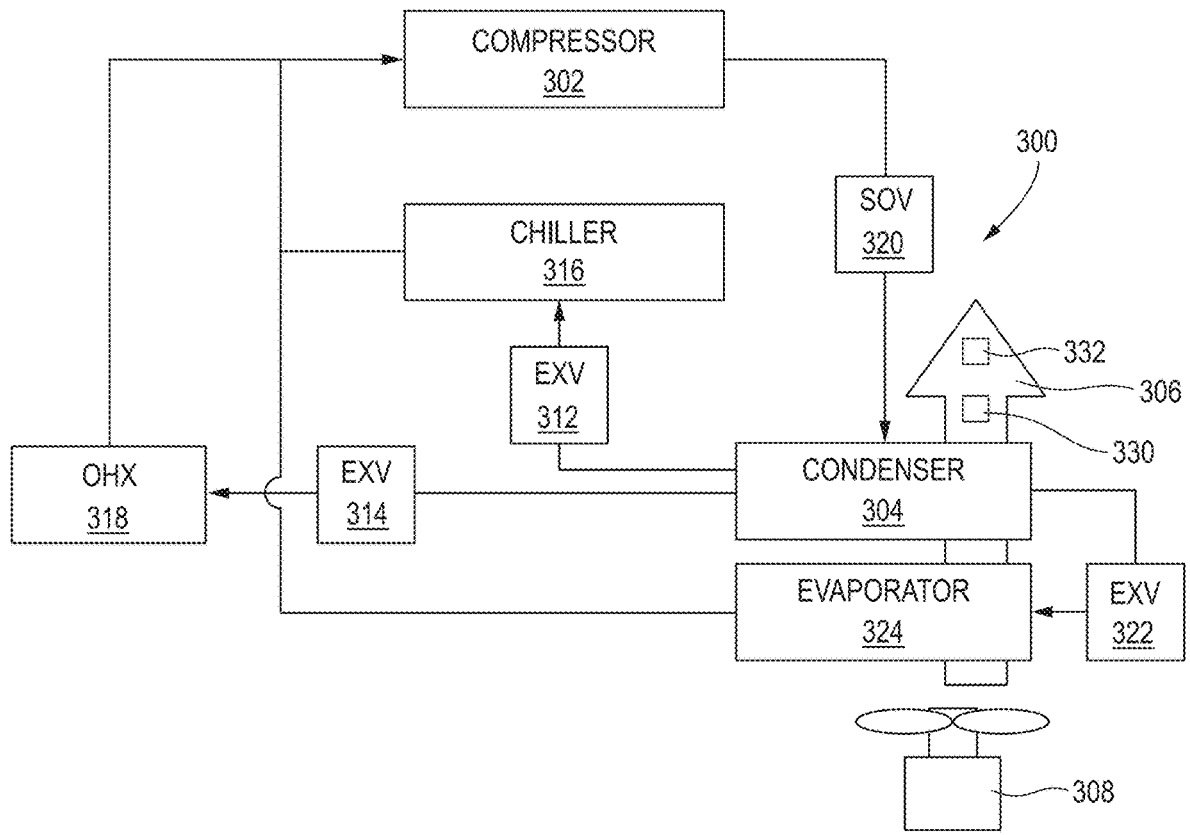
FIG. 3 is schematic diagram showing components of a vapor compression heat transfer system in accordance with certain embodiments.

Referring to FIG. 3, a vapor compression heat transfer system 300 ("system 300") may be used to heat a cabin of the vehicle 100. The system 300 may therefore operate as a heat pump. In the description below, operation of the system 300 as a heat pump is described with the understanding that components of the system 300 may be switched over to function as a refrigeration system for cooling the cabin of the vehicle 100. The illustrated system 300 is exemplary only. Any heat pump system known in the art, particularly those included in vehicles may be used.

The system 300 includes a compressor 302 that compresses a refrigerant within the system 300, such as from a vapor to a liquid, which causes an increase in temperature of the refrigerant. The compressed refrigerant is conducted to a condenser 304. The condenser 304 transfers heat from the compressed refrigerant to the cabin of the vehicle 100. The condenser 304 may be located within the cabin or air flow 306 passing over the condenser 304 may be conducted into the cabin, such as by a fan 308.

The compressed refrigerant exits the condenser 304 and passes through one or more. expansion valves 312, 314. The expansion valves 312, 314 permit the compressed refrigerant to expand and thereby decrease in temperature. The expansion valves 312, 314 may have a range of positions defining the flow of compressed refrigerant through the expansion valves 312, 314. For example, the expansion valves 312, 314 may be implemented as electronic expansion valves (EXV) 312, 314. The expanded refrigerant exiting the EXVs 312, 314 may absorb heat from one or more sources. For example, the expanded refrigerant may pass through a chiller 316. The chiller 316 is a heat exchanger that facilitates the transfer of heat from a coolant of a thermal management system to the expanded refrigerant. The coolant may be circulated by the thermal management system around the battery 110, power electronics 114, and/or drive units 112 of the vehicle 100 to maintain these components in desired ranges.

The expanded refrigerant exiting the expansion valve 314 may pass through an outside heat exchanger 318. The outside heat exchanger 318 facilitates the transfer of heat from the environment of the vehicle 100 into the expanded refrigerant. The outside heat exchanger 318 may therefore be implemented as a radiator including an elongate folded tube with fins. The outside heat exchanger 318 may rely on passive air flow and/or may include a fan to force air flow over the radiator.

Expanded refrigerant exiting the EXVs 312, 314 may return to the compressor 302. In some embodiments, one or more shut off valves (SOV) 320 may be present in the system 300. The SOV 320 may have open and closed states with any intermediate state being traversed when transitioning between the open and closed states. In the illustrated embodiment, a SOV 320 is present between the outlet of the compressor 302 and the inlet of the condenser 304, but other arrangements are possible.

In some embodiments, the system 300 may simultaneously act as a heat pump and a refrigerator. For example, air circulated through the cabin may be cooled to remove moisture from the air in order to defog windows. Accordingly, an evaporator 324 and corresponding EXV 322 supplying expanded refrigerant to the evaporator 324 may also be present. Air flow over the evaporator 324 may be induced by the fan 308 or a separate fan. Expanded refrigerant may be received from a dedicated EXV 322 or one of the other EXVs 312, 314. For example, the evaporator 324 may be in series (e.g., upstream) of the OHX 318, and the expansion valve 322 may be used to control flow of refrigerant through both of the OHX 318 and the evaporator 324. In other embodiments, the evaporator 324 may be in series (e.g., upstream) of the OHX 318, and EXVs 314, 322 are present at the inlets of the OHX 318 and evaporator 324, respectively.

The system 300 may be partially controlled based outputs of a discharge temperature sensor 330 and an air speed sensor 332. In the description below, reference to a target discharge temperature may refer to a target for the output of the temperature sensor. Likewise, in the description below, references to a target air flow may refer to a target output of the air speed sensor 332, which may be resolved to a mass flow rate of the air flow 306.

The system 300 may be controlled to achieve the target discharge temperature and the target air flow using any approach known in the art. Specifically, the speed of the compressor 302, speed of the fan 308, degree of opening of one or more of the EXVs 312, 314, 322, and opening or closing of the SOV 320 may be controlled using any approach known in the art in order to achieve the target discharge temperature and target air flow.

The system 300 is exemplary only. A target discharge temperature and target air flow may also be achieved by other types of systems, such as vapor compression refrigeration system providing cooling with a heater core or resistive element providing heating, the heater core being heated with air from an internal combustion engine or other source of heat.

Figure 4:
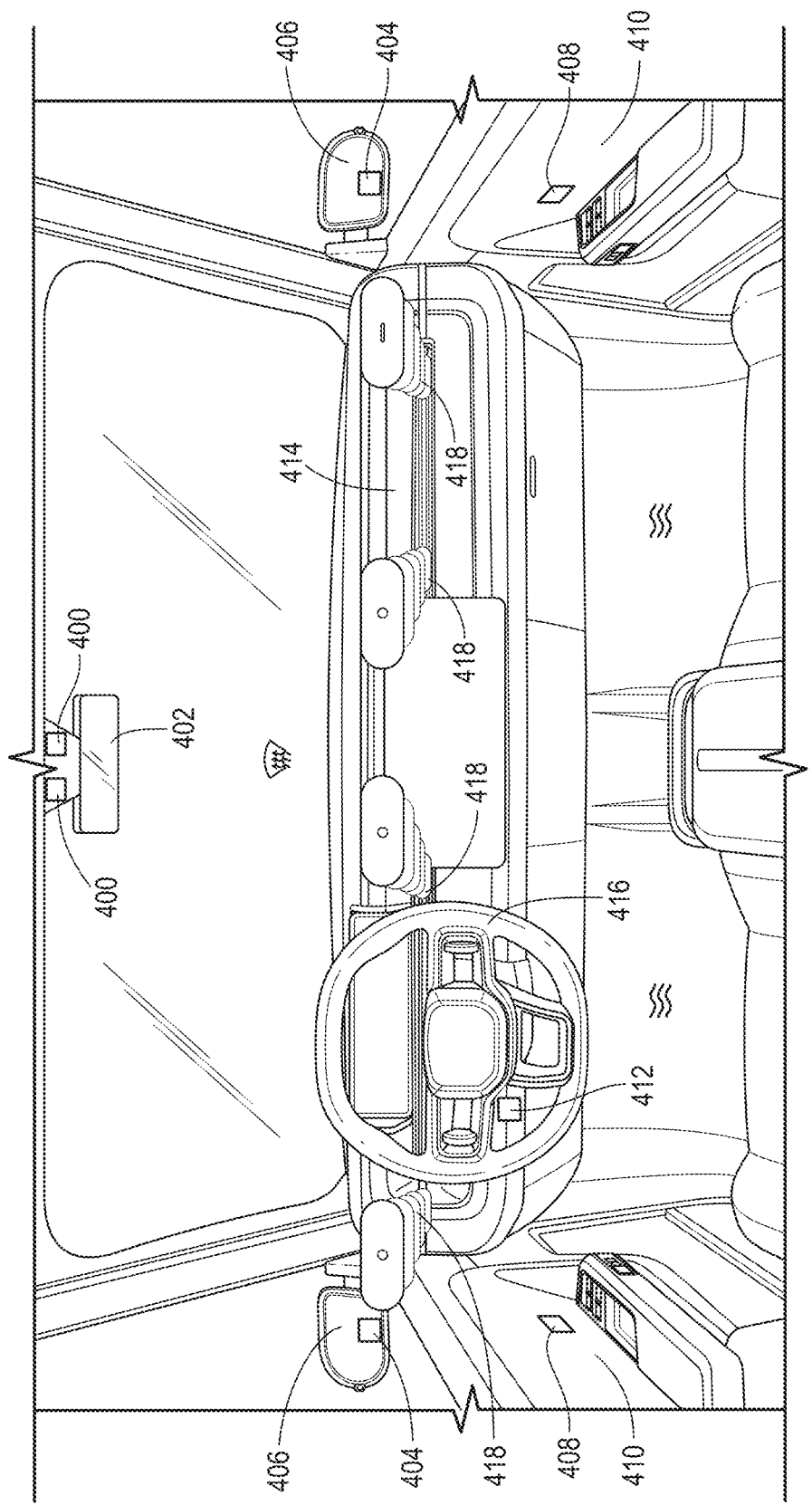
FIG. 4 illustrates sensors that may be used to control a vehicle heating, ventilation, and air conditioning (HVAC) system in accordance with certain embodiments.

Referring to FIG. 4, a vehicle HVAC system may use feedback from one or more sensors in order to select the target discharge temperature and target air flow. Solar load may be detected using one or more sensors 400 mounted to the windshield, such as on or adjacent to a rear-view mirror 402. The one or more sensors 400 may sense visible light, infrared right, temperature, or other value that indicates solar loading of the cabin of the vehicle 100. The one or more sensors 400 may be implemented as sun light rain (SLR) sensors that further detect lighting for purposes of activating headlights and detecting rain for purposes of activating windshield wipers.

The one or more sensors may include one or more sensors 404 configured to sense an ambient temperature of the vehicle. The sensors 404 may advantageously be shielded from direct sunlight. For example, the sensors 404 may be mounted to an underside of one or both side view mirrors 406.

The one or more sensors may include one or more temperature sensors 408 configured to sense the temperature of air within the cabin of the vehicle 100. For example, the one or more temperature sensors 408 may be mounted to doors 410 of the vehicle 100.

In some embodiments, one or more breath temperature sensors 412 may be configured to detect, or a provide an output used to determine, a "breath temperature" of an occupant of the vehicle 100. The breath temperature may be an estimate of air around the face or other portion of the occupant of the vehicle 100. In the illustrated embodiment, the one or more breath temperature sensors 412 are on the dashboard 414 near (e.g., within 20 centimeters) the steering wheel 416 of the vehicle 100. The one or more breath temperature sensors temperature may also be mounted to the steering wheel 416. Other breath sensors 412 may be mounted elsewhere on the dashboard 414 for sensing the breath temperature of other occupants. The one or more breath temperature sensors 412 may be additionally or alternatively be mounted at other locations, such as in a head liner above a seat, and/or some other location. The one or more breath temperature sensors 412 may sense the temperature of air in thermal contact therewith. The breath temperature may additionally or alternatively be derived from the output of an infrared sensor or camera.

The dashboard 414, footwell, or other structure within the cabin may define vents 418 through which air flow 306 is emitted into the cabin. The degree of opening of the vents may be controlled by occupants of the vehicle or selected based on outputs of one or more of the temperature sensors 400, 404, 408, 412. A return vent may conduct exhaust air from the cabin back to the fan 308 or to the environment of the vehicle.

Figure 5:
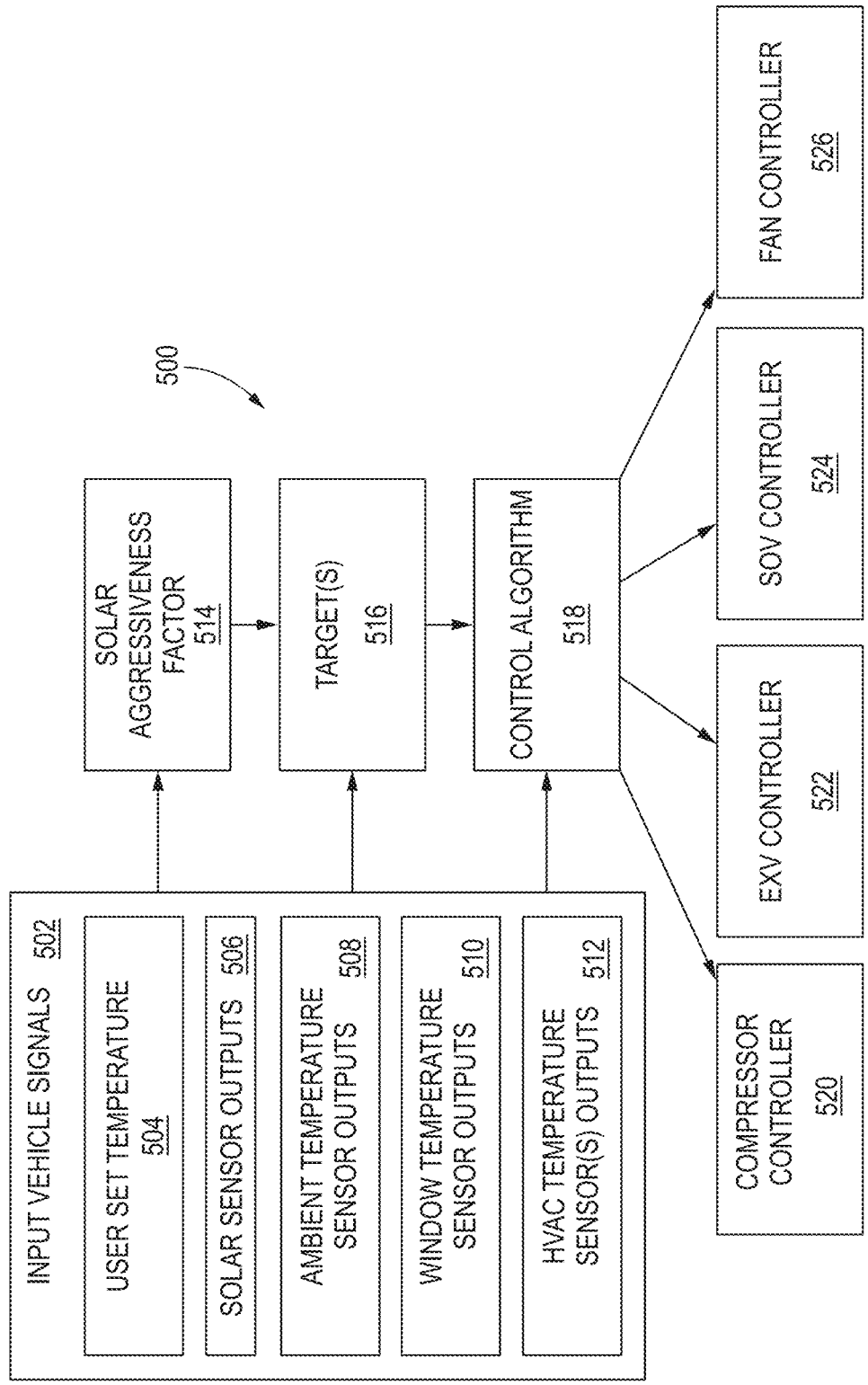
FIG. 5 is a schematic block diagram of components of logic for selecting a target discharge temperature and target airflow for a vehicle HVAC system using a dynamic solar aggressiveness factor determined in accordance with certain embodiments.

FIG. 5 illustrates a control architecture 500 that may be used to select and implement the target discharge temperature and target air flow. The control architecture 500 may be implemented by the control system 214, e.g., a TMM and/or XMM of the control system 214, or some other component, in order to manage heat flow into and out of the cabin of the vehicle 100 using the system 300 or other type of HVAC system.

The control architecture 500 may act in response to input vehicle signals 502. The input vehicle signals 502 may include a user set temperature 504, e.g., a desired cabin temperature specified by an occupant of the cabin through interaction with a control (button or knob) or touch screen. The user set temperature 504 may also be set automatically, such as to a default value.

The input vehicle signals 502 may include solar sensor outputs 506 providing an estimation of solar heat load on the cabin of the vehicle 100, such as the output of the one or more sensors 400. The input vehicle signals 502 may include ambient temperature sensor outputs 508 providing an estimation of an ambient temperature of the vehicle, such as the output of the one or more sensors 404. The input vehicle signals 502 may include windshield temperature sensor outputs 510 providing an estimation of a temperature of the vehicle. The windshield temperature may be provided by the one or more sensors 400 or a separate sensor.

The input vehicle signals 502 may include one or more HVAC temperature sensor outputs 512, such as the output of any of the temperature sensors 408, 412 and the outputs of the discharge temperature sensor 330 and air speed sensor 332.

Some or all of the input vehicle signals 502 may be used to calculate a solar aggressiveness factor 514. The solar aggressiveness factor 514 estimates the effect of solar radiation on the comfort of an occupant and on the overall heat load within the cabin. The solar aggressiveness factor 514 may therefore be used to increase refrigeration or decrease heating.

The solar aggressiveness factor 514 according to the embodiments disclosed herein advantageously accounts for the state of air within the cabin. To that end, the solar aggressiveness factor 514 may be a function of some or all of the breath temperature ($T_{br}$), a discharge temperature ($T_{dis}$, e.g., target discharge temperature or measured discharge temperature) of the air flow 306, an ambient temperature ($T_{amb}$, e.g., ambient temperature sensor outputs 508), a windshield temperature ($T_{ws}$, e.g., windshield temperature sensor outputs 510), and a solar heat load ($Q_s$, e.g., the solar sensor outputs 506). The solar heat load $Q_s$ may be an average of the output of multiple sensors 400, e.g., the average of the output $Q_L$ of a left sensor 400 and the output $Q_R$ of right sensor 400. The breath temperature $T_{br}$ is used as a feedback temperature that is compared to a user set temperature ($T_{US}$) in the examples below with the understanding that other temperatures, including outputs of some or all of the temperature sensors 408, 412 may instead be used as the feedback temperature.

The solar aggressiveness factor 514 may be computed by first calculating an estimate temperature of mean radiation temperature $T_{mr}$, which corresponds to radiative heat transfer through the windshield (and possibly other windows) of the vehicle 100. For example, $T_{mr}$ may be calculated according to (1).

$$T_{mr}=Q_s^{C_5}+C_6(T_{ws}-T_{amb})+C_7*T_{ws}+273 \tag{1}$$

The solar aggressiveness factor ($K_A$) may then be calculated according to (2).

$$K_A = K_S \frac{T_{mr}^4 - T_{br}^4}{(T_{br} - T_{dis})^{C_7}} \tag{2}$$

The coefficient $K_S$ may be a function of solar load and may be calculated according to (3).

$$K_S=C_2*Q_s^2+C_3*Q_s+C_4+C_1 \tag{3}$$

The constants $C_1$ to $C_7$ may be experimentally determined. For example, a temperature sensor placed on or near a face or other part of an occupant (person or artificial model of a person) may be used as a perceived temperature indicating what an occupant would actually experience. The merit of a particular set of values for constants $C_1$ to $C_7$ may be determined based on the difference between the perceived temperature and a given user set temperature $T_{US}$. Accordingly, experiments may include, for a variety of environmental conditions ($T_{amb}$, $Q_s$) and initial conditions ($T_{br}$, $T_{dis}$, $T_{ws}$) and a user set temperature $T_{US}$, measuring or modeling the perceived temperature relative to the user set temperature $T_{US}$ for a time period. Values of the constants $C_1$ to $C_7$ determined according to the experiments to provide an acceptable error between the perceived temperature and the user set temperature $T_{US}$ may then be selected for use in production vehicles.

The value of the constants $C_1$ to $C_7$ may be adjusted over time as a vehicle 100 is used. For example, possible sets of values for the constants $C_1$ to $C_7$ may be evaluated by comparing $T_{br}$ to the user set temperature $T_{US}$. If a new set of values for the constants $C_1$ to $C_7$ is found to provide improved tracking of the user set temperature $T_{US}$ by $T_{br}$, the new set of values may be used moving forward.

The solar aggressiveness factor $K_A$ may then be used to adjust (e.g., scale) a solar offset used to determine one or more targets 516, such as a target discharge temperature and a target airflow. For example, let $K_{SD}$ be a solar discharge temperature offset and let $K_{AF}$ be a solar airflow offset.

The target discharge temperature $T_{dis,T}$ may then be calculated according to (4) and the target airflow $AF_T$ may then be calculated according to (5), where $f_T$ and $f_A$ are functions taking some or all of the input arguments shown in (4) and (5) to determine $T_{dis,T}$ and $AF_T$. For example, $f_T$ may be $T_{US}$ plus a positive value when heating or plus a negative value when cooling. $f_A$ may give a value that increases with an increase in the magnitude of a difference between $T_{US}$ and $T_{br}$. As is apparent in FIGS. 4 and 5, the result of $K_A$ may be to reduce the offset resulting from $Q_s*K_{SD}$ and/or $Q_s^*K_{AF}$ in some scenarios. In some embodiments, $K_A$ is clamped to a maximum value, such as 1, such that $K_A$ only functions to reduce the contribution of the $Q_s^*K_{SD}$ and/or $Q_s^*K_{AF}$ in (4) and (5) in certain scenarios but otherwise has no effect.

$$T_{dis,T} = f_T(T_{amb}, T_{US}, T_{br}, \ldots) + Q_s^*K_{SD}^*K_A \quad (4)$$

$$AF_T = f_A(T_{amb}, T_{US}, T_{br}, \ldots) + Q_s^*K_{AF}^*K_A \quad (5)$$

Once obtained, the targets 516 may be provided to a control algorithm 518, the control algorithm 518 may provide targets for the operation of one or more components of the system 300 in order to achieve the targets 516. The control algorithm 518 may perform feedback control such that the targets for the operation of the one or more components may change based on sensed values, such as one or more of the HVAC temperature sensor outputs 512.

For example, the control algorithm 518 may provide a speed (e.g., revolutions per minute) target to a compressor controller 520 configured to control the compressor 302, an opening percentage to an EXV controller 522 for one or more of the EXVs 312, 314, 322, a state (open or closed) to an SOV controller 524 controlling the SOV 320, and/or a fan speed to a fan controller 526 controlling operation of the fan 308.

Figure 6:
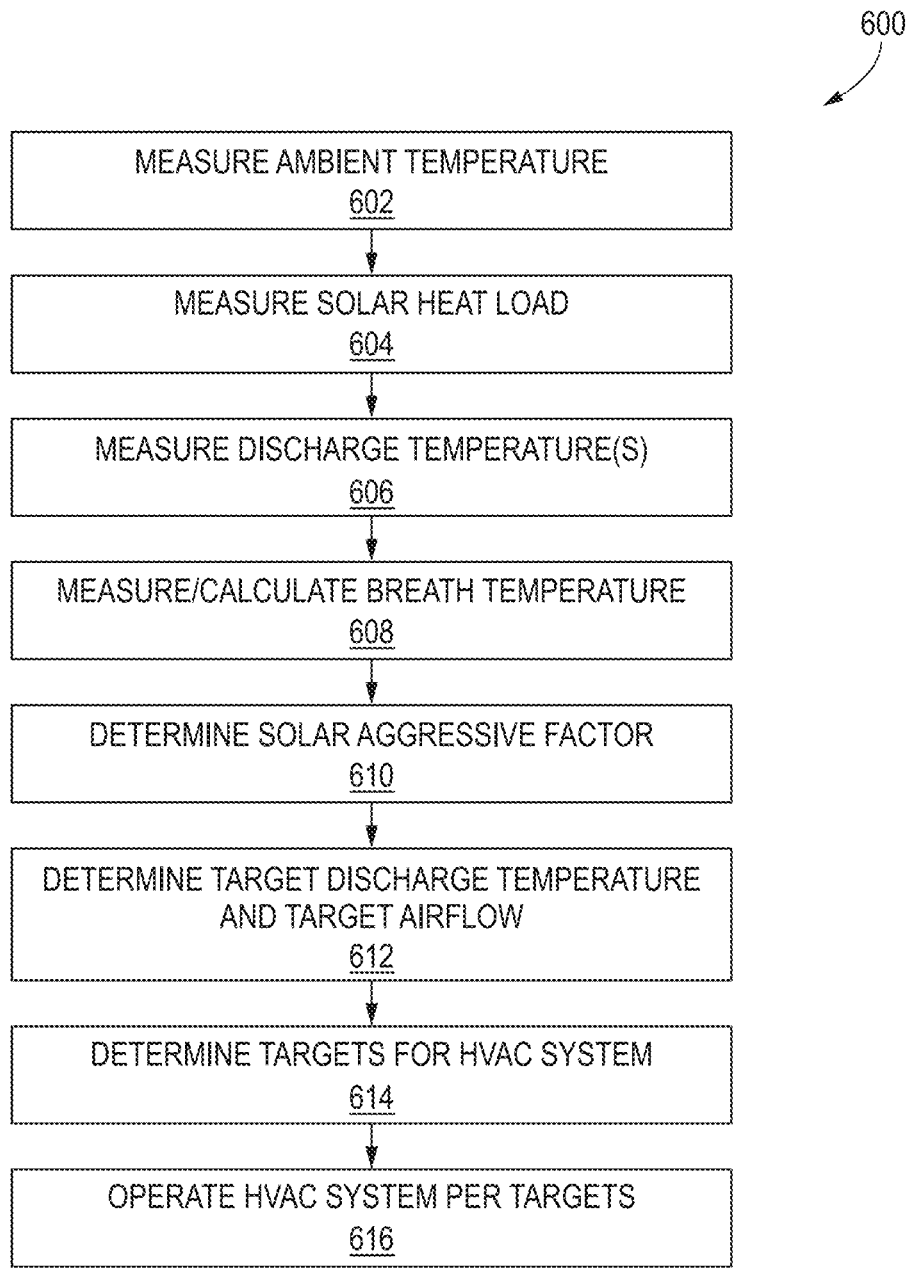
FIG. 6 is a process flow diagram of a method for controlling a vehicle HVAC system in accordance with certain embodiments.

FIG. 6 illustrates a method 600 that may be performed using the control architecture 500. The method 600 may be implemented by the control system 214, e.g., a TMM and/or XMM of the control system 214, or some other component. The method 600 may include measuring, at step 602, an ambient temperature $T_{amb}$; measuring, at step 604, a solar heat load (e.g., $Q_s$ and possibly $T_{ws}$); measuring, at step 606, a discharge temperature $T_{dis}$; and measuring, at step 608, a breath temperature $T_{br}$. The discharge temperature may closely track the target discharge temperature such that the discharge temperature at 606 may be a target discharge temperature rather than a measured temperature, such as from a previous iteration of the method 600 or based on the user set temperature $T_{ws}$. The breath temperature $T_{br}$ may be the temperature measurement output by one or more temperature sensors or derived therefrom using one or more computations.

The method 600 may include determining, at step 610, a solar aggressiveness factor $K_A$ that is a function of the state of the air in the cabin, such as the breath temperature $T_{br}$ and the discharge temperature $T_{dis}$. The solar aggressiveness factor $K_A$ may further be a function of the solar heat load (e.g., $Q_s$ and possibly $T_{ws}$). In general, the solar aggressiveness factor $K_A$ may decrease with decreasing breath temperature $T_{br}$ when cooling and increase with increasing breath temperature $T_{br}$ when heating.

The method 600 may include determining, at step 612, a target discharge temperature $T_{dis,T}$ and a target air flow $AF_T$ using the solar the solar aggressiveness factor $K_A$, such as according to (4) and (5). Note that, in some embodiments, only one of $T_{dis,T}$ and $AF_T$ is adjusted according to solar heat load and the solar aggressiveness factor $K_A$.

The method 600 may then include determining, at step 614, targets for one or more components of an HVAC system in order to achieve the target discharge temperature $T_{dis,T}$ and a target air flow $AF_T$. For example, step 614 may include selecting some or all of a speed (e.g., revolutions per minute) target for the compressor 302, an opening percentage for one or more EXVs 312, 314, 322, a state (open or closed) of the SOV 320, and/or a fan speed for the fan 308. The HVAC system may then be operated, at step 616, according to the targets.

The method 600 may be iterated repeatedly over time to account for variations in solar load. Steps 614 and 616 may be performed repeatedly for each iteration of the method 600 in order to achieve the target discharge temperature $T_{dis,T}$ and a target air flow $AF_T$ from step 612.

In use, for a first temperature range of $T_{br}$, the solar aggressiveness factor actually causes the solar offset to increase, thereby increasing the rate at which the cabin is cooled. In a second temperature range of $T_{br}$ that is lower than the second temperature range, the solar aggressiveness factor causes a small reduction in the solar offset (e.g., about −0.5). In a third temperature range of $T_{br}$ that is lower than in the second temperature range, the solar aggressiveness factor causes a larger reduction in the solar offset (e.g., about −2).

An advantage of the solar aggressiveness factor $K_A$ is that transient changes to solar heat load will be less likely to cause abrupt increases in cooling or heating in situations where such abrupt changes are not needed. For example, when the cabin is relatively close to the user set temperature $T_{US}$, sudden increases in cooling may be perceived as unpleasant or jarring. The solar aggressiveness factor $K_A$ may therefore serve to reduce such abrupt increases.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A vehicle comprising:
   a system configured to supply air to a cabin of the vehicle at a target discharge temperature;
   one or more solar sensors configured to sense a solar radiation on the cabin;
   one or more temperature sensors configured to sense air within the cabin; and
   a controller coupled to the system, the one or more solar sensors, and the one or more temperature sensors, the controller configured to:
   receive a user set temperature;
   obtain a solar heat load from one or more outputs of the one or more solar sensors;
   obtain a feedback temperature from one or more outputs of the one or more temperature sensors;
   determine a radiation temperature corresponding to radiative heat transfer into the cabin, the radiation temperature being a function of the feedback temperature and the solar heat load;
   determine a solar offset according to the solar heat load;
   determine a scaled solar offset by scaling the solar offset according to a difference between the radiation temperature and the feedback temperature; and
   set the target discharge temperature according to the user set temperature, the feedback temperature, and the scaled solar offset.

2. The vehicle of claim 1, wherein the solar offset is negative.

3. The vehicle of claim 2, wherein the solar offset is between −0.1 and −0.14.

4. The vehicle of claim 1, wherein the controller is configured to scale the scaled solar offset by a solar aggressiveness factor, the solar aggressiveness factor being a function of a difference between the radiation temperature to a fourth power and the feedback temperature to the fourth power.

5. The vehicle of claim 1, wherein the system is configured to supply the air to the cabin at a target airflow, the controller being further configured:
   determine a first airflow as a function of the user set temperature and the feedback temperature; and
   set the target airflow based on the first airflow and the scaled solar offset.

6. The vehicle of claim 1, wherein the radiation temperature is further a function of an ambient temperature of the vehicle.

7. The vehicle of claim 1, wherein the radiation temperature is further a function of a temperature of a windshield of the vehicle.

8. The vehicle of claim 1, wherein the feedback temperature is a breath temperature for an occupant of the vehicle.

9. The vehicle of claim 1, wherein the system includes a vapor compression heat exchanger.

10. A method comprising:
    receiving, by a controller of a vehicle, a first output from a solar radiation sensor;
    obtaining, by the controller, a feedback temperature from one or more temperature sensors sensing air within a cabin of the vehicle;
    obtaining, by the controller, a solar heat load from the first output;
    receiving, by the controller, a user set temperature;
    determining, by the controller, a mean radiation temperature corresponding to radiative heat transfer into the cabin, the mean radiation temperature being a function of the feedback temperature and the solar heat load;
    determining, by the controller, a solar offset according to the solar heat load;
    determining, by the controller, a scaled solar offset by scaling the solar offset according to a difference between the mean radiation temperature and the feedback temperature;
    determining, by the controller, a target discharge temperature according to the user set temperature, the feedback temperature, and the scaled solar offset; and
    configuring, by the controller, a system to supply air to the cabin at the target discharge temperature.

11. The method of claim 10, wherein the solar offset is negative.

12. The method of claim 11, wherein the solar offset is between −0.1 and −0.14.

13. The method of 10, further comprising scaling, by the controller, the scaled solar offset by a solar aggressiveness factor, the solar aggressiveness factor being a function of a difference between the mean radiation temperature to a fourth power and the feedback temperature to the fourth power.

14. The method of claim 10, further comprising:
    determining, by the controller, a first airflow as a function of the user set temperature and the feedback temperature; and
    setting, by the controller, a target airflow of the system based on the first airflow and the scaled solar offset.

15. The method of claim 10, wherein the mean radiation temperature is further a function of an ambient temperature of the vehicle.

16. The method of claim 10, wherein the mean radiation temperature is further a function of a temperature of a windshield of the vehicle.

17. The method of claim 10, wherein the feedback temperature is a breath temperature for an occupant of the vehicle.

18. The method of claim 10, wherein the system includes a vapor compression heat exchanger.

* * * * *